United States Patent
Campbell et al.

(10) Patent No.: US 7,196,728 B2
(45) Date of Patent: Mar. 27, 2007

(54) METHOD AND APPARATUS FOR DISPLAYING IMAGES IN COMBINATION WITH TAKING IMAGES

(75) Inventors: Robert Craig Campbell, Cranberry Township, PA (US); David Markham Drury, Pittsburgh, PA (US); Richard E. Huber, Harmony, PA (US); John P. Strait, Pittsburgh, PA (US)

(73) Assignee: Ericsson, Inc., Warrendale, PA (US)

( * ) Notice: Subject to any disclaimer, the term of this patent is extended or adjusted under 35 U.S.C. 154(b) by 599 days.

(21) Appl. No.: 10/115,323

(22) Filed: Mar. 27, 2002

(65) Prior Publication Data

US 2003/0193599 A1 Oct. 16, 2003

(51) Int. Cl.
*H04N 5/225* (2006.01)
*H04N 5/222* (2006.01)

(52) U.S. Cl. ............... 348/340; 348/333.08; 345/87
(58) Field of Classification Search ........... 250/208.1; 345/87, 901, 905
See application file for complete search history.

(56) References Cited

U.S. PATENT DOCUMENTS 5,648,655 A * 7/1997 Rostoker ............... 250/208.1
5,691,116 A * 11/1997 Revelli et al. ............ 430/321
5,696,550 A * 12/1997 Aoki et al. ................ 348/125
5,977,535 A * 11/1999 Rostoker ............... 250/208.1
6,867,821 B2 * 3/2005 De Schipper ............. 349/28

FOREIGN PATENT DOCUMENTS

GB         2 273 411 A      6/1994
WO     WO 02 43386 A       5/2002

OTHER PUBLICATIONS

"Patent Abstracts of Japan," vol. 2000, No. 25, Apr. 12, 2001 & JP 2001 231019 A, (SONY CORP.), Aug. 24, 2001 abstract.

* cited by examiner

*Primary Examiner*—Ngoc-Yen Vu
*Assistant Examiner*—Carramah J. Quiett
(74) *Attorney, Agent, or Firm*—Ansel M. Schwartz

(57) ABSTRACT

An imaging apparatus. The apparatus includes a display mechanism for displaying an image. The apparatus includes a camera mechanism distributed throughout the display mechanism to take images of objects in view of the display mechanism. A screen. The screen includes a display for displaying an image. The screen includes a plurality of pinholes distributed in the display. The screen includes a plurality of sensors with at least one sensor of the plurality of sensors in alignment with and corresponding with one pinhole of the plurality of pinholes to receive light passing through the pinhole to image a ray of a specific size and a specific direction out from the display. A method for imaging.

11 Claims, 2 Drawing Sheets

METHOD AND APPARATUS FOR DISPLAYING IMAGES IN COMBINATION WITH TAKING IMAGES

FIELD OF THE INVENTION

The present invention is related to displays that have a camera positioned to allow a viewer to look at the display and be seen as looking directly at the camera. More specifically, the present invention is related to a display having sensors distributed throughout the display to form an image of a viewer looking at the display.

BACKGROUND OF THE INVENTION

A basic problem with video communication equipment is that the display device and the imaging device (camera) are physically separated, eliminating the ability for direct, natural eye contact and transparent gaze awareness. Extensive work has been done researching this problem and proposing physical and/or compute based solutions (see references below). The need to both image and display is fundamental to many activities, including communicating, documenting, document scanning, security, etc.

This invention combines an electronic display with an imaging device in a way that permits the point of view of the imaging device to be placed directly behind the display itself, enabling direct, natural eye contact. In addition, the device has the ability to scan like a flatbed scanner, and functionally zoom, pan, tilt, and shift without moving parts within the limits of its design, like a PTZ camera.

Prior art for the present invention includes displays with integrated cameras, such as CRTs, notebook computers, PDAs, monitor top cameras, etc. Devices using partially silvered mirrors, projectors, CRTs with cameras integrated into the tube, and other approaches have been investigated in the past, but did not have any integration of display and imaging at the pixel level.

SUMMARY OF THE INVENTION

The present invention pertains to an imaging apparatus. The apparatus comprises a display means for displaying an image. The apparatus comprises a camera means distributed throughout the display means to take images of objects in view of the display means.

The present invention pertains to a screen. The screen comprises a display for displaying an image. The screen comprises a plurality of pinholes distributed in the display. The screen comprises a plurality of sensors with at least one sensor of the plurality of sensors in alignment with and corresponding with one pinhole of the plurality of pinholes to receive light passing through the pinhole to image a ray of a specific size and a specific direction out from the display.

The present invention pertains to a method for imaging. The method comprises the steps of applying a first image on a first portion of a screen. There is the step of receiving light from objects at a second portion of the screen. The second portion is distributed in the first portion. There is the step of forming a second image from the light from objects received at the second portion.

The present invention allows the creation of a combination display/imaging device which functions like a window does, allowing a remote "outside" person to look in, while allowing the person "inside" to see out. The combination of functions is natural and solves the well known eye gaze problem in visual communication. The design takes advantage of electronic integration techniques to reduce part count, cost, and moving parts, and enables the development of display/image devices with very wide application areas.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
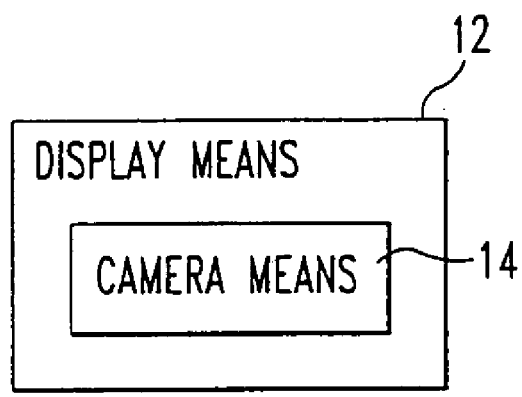
FIG. 1 is a schematic representation of an apparatus of the present invention.

Referring now to the drawings wherein like reference numerals refer to similar or identical parts throughout the several views, and more specifically to FIG. 1 thereof, there is shown an imaging apparatus 10. The apparatus 10 comprises a display means 12 for displaying an image. The apparatus 10 comprises a camera means 14 distributed throughout the display means 12 to take images of objects in view of the display means 12.

Figure 2:
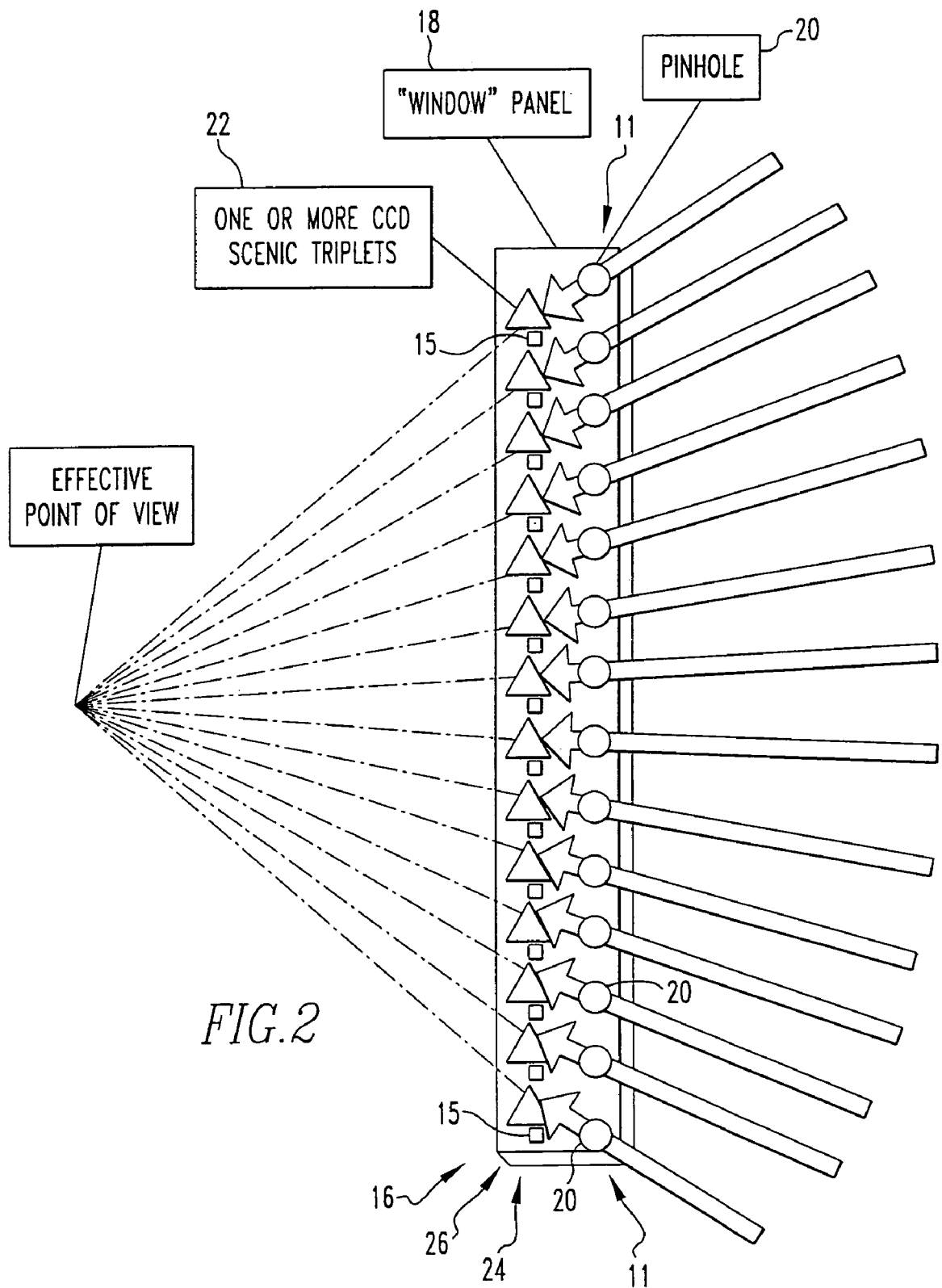
FIG. 2 is a schematic representation of a screen of the present invention.

The present invention pertains to a screen 16, as shown in FIG. 2. The screen 16 comprises a display 18 for displaying an image. The screen 16 comprises imaging means 11 for forming an images, such as a plurality of pinholes 20 or lenses distributed in the display 18. The screen 16 comprises a plurality of sensors 22 with at least one sensor of the plurality of sensors 22 in alignment with and corresponding with one pinhole of the plurality of pinholes 20 to receive light passing through the pinhole to image a ray of a specific size and a specific direction out from the display 18.

Connected to each sensor is preferably image processing means 15 having algorithms to enhance the image by addressing diffraction artifacts and light fall off. Preferably, the algorithms are embedded in the screen and the data from the sensors are fed to them by connections built into the screen, as is well known to one skilled in the art.

Preferably, the sensors 22 are single pixel sensors 22. The sensors 22 are preferably arranged to converge to a point. Preferably, wherein the sensors 22 are arranged to define an effective point of view behind the display 18. There are preferably multiple sensors 22 in alignment with each pinhole to combine multiple rays of light behind each panel. Preferably, each sensor is about 0.2 mm from the respective pinhole.

The present invention pertains to a method for imaging. The method comprises the steps of applying a first image on a first portion 24 of a screen 16. There is the step of receiving light from objects at a second portion 26 of the screen 16. The second portion 26 is distributed in the first portion 24. There is the step of forming a second image from the light from objects received at the second portion 26.

Preferably, the forming step includes the step of converging rays of the light to a desired point. The receiving step preferably includes the step of receiving the light at the second portion 26 having sensors 22 distributed in the first portion 24. Preferably, the receiving step includes the step of receiving rays of light at the sensors 22 that pass through pinholes 20 in the second portion 26.

In the operation of the invention, utilizing flat panel display technology, such as organic polymer displays, integrate a large number of single pixel (3 color) pinhole "cameras" across the display 18 surface. By using IC fabrication techniques, fabricate and align the single pixel sensors 22 with accurately positioned and shaped pin holes, so that each pixel accurately images a ray of a specific size in a specific direction out from the screen 16. By selecting and ordering a set of imaging pixels with rays that converge to a point, an image can be generated. The effective point of view of this image is (typically) behind the panel, providing a more natural image without wide-angle view distortion, while maintaining a thin panel profile. Alternatively, lenses can be used instead of the pinholes. The lenses are formed in a like manner as the pinholes.

By having many such single pixel "cameras" and intelligently designing the size, direction, and sensor distance of the pinholes 20, the angle of view (zoom), direction of view (pan and tilt), and position of view (shift) can be controlled by selection and order of a subset of pixels. Focus is fixed by the pinhole effect to be equal to the resolution of the selected set of pixels. By placing more than 1 pixel's sensors 22 behind a pinhole, and varying the geometry of the sensors 22, multiple rays can be combined behind a single pinhole.

Use of the panel as a scanner is possible by using all pixels in physical order due to the nearness of the imaged plane. The display 18 light can be used to illuminate the paper or other object placed on the panel. By scanning display 18 light across the panel, it is possible to increase contrast and provide data appropriate for fingerprint/hand recognition. Some image processing may be necessary to deal with the small pixel size compared with the total screen 16 area.

By using the data from pixels of non-convergent rays, distance and position information can be developed, providing a method for 3D position sensing.

Use of a light pen, where the pen device emits a known color or modulated pattern, could be used to implement graphic tablet functionality. Changing the modulation of the pen could be used to indicate different color pens, varying pressure, the user's identity, etc.

Stereo imaging can be performed by appropriately designing and selecting the sensor pixel rays.

The convergence point for a set of rays can be behind or in front of the panel, providing some control of effective point of view, and allowing a thin device close to the viewer to have a more "comfortable" point of view well behind the screen 16.

Many other effects can be generated by using the data from a superset of the pixels required for an image. The actual design of the imaging pixel patterns would be somewhat application specific, with tradeoffs being made for cost, resolution, zoom/pan/tilt/shift range, and special functions such as stereo imaging and 3D position sensing.

The basic geometry of a single pixel pinhole camera, assuming a 640×480 resolution, square pixels, and a 70° horizontal angle of view, requires 640/70°=0.109° per pixel. With the size of an RGB CCD element set at about 0.01 mm (0.007 for each color in current CCDs), the pinhole needs to be about 0.2 mm in front of the sensors 22, which is practical to implement. The size of the pinhole would need to be determined for correct exposure and diffraction tradeoffs for a given application. There needs to be no reflection generated from the sides of the path between the pinhole and the sensor. Refraction indices of the materials involved would change these values slightly. The biggest issue is the diffraction affects from the small pinhole size. This must be dealt with or the geometry changed to achieve an optimal image.

The panel area consumed by the pinholes 20 is, ideally, the entire surface. This would eliminate the mismatch between the ray imaged by a single element and the equivalent ray from a traditional camera located at the convergence point. Note that a panel of nothing but holes is a window. The practical requirement of using a small portion of this area, (so that the display 18 retains sufficient image quality), introduces some tradeoffs. The rays that are imaged by a series of pinholes 20 spaced around the panel is somewhat different than the optimal view from the convergence point. If the distance to the imaged object is known, this can be dealt with, otherwise there will be an un-imaged gridline region close to the screen 16 and overlapping pixels farther away. A compromise can be reached here based on the practical use distance of the screen 16, and note that the un-imaged gridlines are similar to the coverage of the sensors 22 in a traditional CCD array with a focused image. Pinholes 20 that are significantly smaller than a display 18 pixel (<0.01") would not significantly affect the viewability of a 100 DPI display 18. Also of interest is the transparency characteristic of the newer organic display 18 technologies, resulting in placing an imaging panel behind the display 18 panel and synchronizing image capture with display 18 pixel blanking. Micro-machine techniques to adjust the image characteristics can also be used.

Image quality of pinhole cameras is limited by the tradeoff between the diffraction of a small pinhole vs. the geometric resolution imposed by the pinhole size. Unlike film, in the electronic domain, there is the ability to work with the data that comes from the sensors 22 in real time, doing a convolution or other filtering to compensate for the far-field (Fresnel) and near-field (Fraunhofer) diffraction affects. If necessary, this can be done for multiple frequencies based on the 3 color detectors, compensating or using the positional offset of the triplet sensors 22 to improve the image further.

Figure 3:
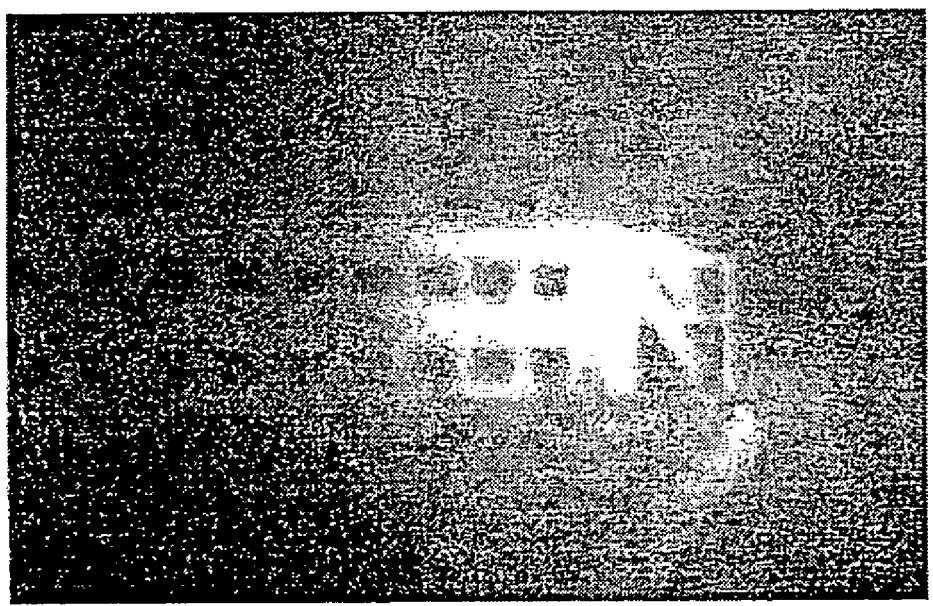
FIG. 3 is an image taken by the apparatus.

Images were taken with a small CCD board camera with a ¼" CCD array was used. An image was taken with the supplied 3.8 mm lens, and a roughly corresponding image was taken using a good quality 100 micron (0.004") pinhole. This pinhole diameter is optimal for a 2–3 mm focal length. The image was generated by handholding the pinhole above the CCD sensor, with minimal shielding of the sensor from stray light, which reduced the contrast somewhat. FIG. 3 shows the resulting image taken by the array.

Interconnection and interfacing to the imaging pixels is done by a scanning technique similar to existing CCDs. However, the potential for multiple megapixels will require extensions to enable real time video performance. This is accomplished by parallel scanning several rows at a time, smart grouping of pixels into subsets that are not used at the same time, or an addressing technique. Interface from the panel to the host should not be burdened with the extraneous pixel data. Use of an FPGA device utilizing Adaptive Computing techniques to select, order, and otherwise process the data coming from the sensors 22 allows full flexibility and performance to be maintained. An LVDS electrical interface to the host is provided for interconnect, in parallel to the display 18 drive interface.

The image processing addresses diffraction artifacts and light fall off due to each lens or pinhole. The image processing is well known to one skilled in the art for this purpose as is well known to one skilled in the art. The imaging data from each sensor is enhanced by well known image processing algorithms. The algorithms themselves are preferably implanted in a part of the screen itself, which is really just a very large chip.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A screen comprising:
    a display for displaying an image;
    a plurality of imaging means for forming an image distributed in the display, each imaging means is a pinhole; and
    a plurality of single pixel sensors with at least one sensor of the plurality of sensors in alignment with a corresponding pinhole of the plurality of pinholes to receive light passing through the pinhole to image a ray of a specific size and a specific direction out from the display, there are multiple sensors in alignment with each pinhole to combine multiple rays of light behind each pinhole, the sensors being arranged such that said rays of light converge to a single point behind the sensors.

2. A screen as described in claim 1 wherein the sensors are arranged to converge to a point.

3. A screen as described in claim 2 wherein the sensors are arranged to define an effective point of view behind the display.

4. A screen as described in claim 3 wherein each sensor is about 0.2 mm from the respective pinhole.

5. A screen as described in claim 1 wherein each imaging means is a lens.

6. A screen as described in claim 1 including image processing means connected to each sensor for enhancing the image.

7. A screen as described in claim 6 wherein the image processing means compensates for diffraction artifacts and light fall off.

8. A screen as described in claim 7 wherein the image processing means is in contact with the display.

9. A method for imaging comprising the steps of:
    applying a first image on a first portion of a screen;
    receiving light from pinholes at a second portion of the screen, the second portion distributed in the first portion;
    sensing a respective ray of light received from each respective pinhole with a respective one of a plurality of sensors, the plurality of sensors being arranged such that the rays of light converge to a single point behind the sensors; and
    forming a second image from the light from the pinholes in the second portion by converging rays at the single point.

10. A method as described in claim 9 wherein the receiving step includes the step of receiving the light at the second portion having sensors distributed in the first portion.

11. A method as described in claim 10 wherein the receiving step includes the step of receiving rays of light at the sensors that pass through pinholes in the second portion.

* * * * *